United States Patent
Teranishi et al.

[11] Patent Number: 5,556,667
[45] Date of Patent: Sep. 17, 1996

[54] METHOD OF FORMING WATER-REPELLENT FILM ON TRANSPARENT PANEL

[75] Inventors: Toyoyuki Teranishi; Hiroaki Kobayashi, both of Kanagawa; Jun Kawaguchi, Tokyo, all of Japan

[73] Assignee: Nippon Sheet Glass Co., Ltd., Japan

[21] Appl. No.: 352,551

[22] Filed: Dec. 8, 1994

[30] Foreign Application Priority Data

Dec. 8, 1993 [JP] Japan ................................. 5-307823

[51] Int. Cl.$^6$ ............................. B05D 5/06; B05D 1/34; C03C 17/30; C03C 17/34
[52] U.S. Cl. ................. 427/164; 427/163.1; 427/165; 427/269; 427/284; 427/426
[58] Field of Search ............................ 427/163.1, 165, 427/154, 336, 269, 420, 273, 426, 284, 168, 164, 379

[56] References Cited

U.S. PATENT DOCUMENTS

| | | | |
|---|---|---|---|
| Re. 25,767 | 4/1965 | Auffenorde et al. | |
| 2,887,412 | 5/1959 | Thomas | 427/426 |
| 3,920,862 | 11/1975 | Damschroder et al. | 427/420 |
| 4,297,396 | 10/1981 | Takehara et al. | 427/284 |
| 4,341,821 | 7/1982 | Toda et al. | 427/336 |
| 4,344,991 | 8/1982 | Gray | 427/426 |
| 4,396,651 | 8/1983 | Behmel et al. | 427/426 |
| 4,477,486 | 10/1984 | Boaz | 427/284 |
| 4,479,987 | 10/1984 | Koepke et al. | 427/420 |
| 4,935,264 | 6/1990 | Tsujino et al. | 427/284 |
| 4,976,992 | 12/1990 | Chino et al. | 427/131 |
| 4,997,684 | 3/1991 | Franz et al. | 427/165 |
| 5,075,139 | 12/1991 | Crumbach et al. | 427/163 |
| 5,266,358 | 11/1993 | Uemura et al. | 427/376.2 |
| 5,370,905 | 12/1994 | Varga et al. | 427/284 |
| 5,424,130 | 6/1995 | Nakanishi et al. | 428/410 |
| 5,500,274 | 3/1996 | Francis et al. | 427/284 |

FOREIGN PATENT DOCUMENTS

| | | |
|---|---|---|
| 0513727 | 11/1992 | European Pat. Off. |
| 0570260 | 11/1993 | European Pat. Off. |
| 2841287 | 4/1980 | Germany. |
| 4-338137 | 11/1992 | Japan. |
| 4-359086 | 12/1992 | Japan. |
| 5-024886 | 2/1993 | Japan. |
| 5-024885 | 2/1993 | Japan. |
| 940399 | 10/1961 | United Kingdom. |

*Primary Examiner*—Diana Dudash
*Attorney, Agent, or Firm*—Merchant, Gould, Smith, Edell, Welter & Schmidt

[57] ABSTRACT

A water-resistant film is formed on a transparent panel such as an automobile window glass panel by applying a coating solution to a surface of a to be coated of the transparent panel, applying a solvent to a surface of a region not to be coated of the transparent panel in partly overlapping relation to the coating solution applied to the region to be coated, drying the applied coating solution and solvent, and thereafter baking the coating solution into a water-resistant film.

10 Claims, 2 Drawing Sheets

METHOD OF FORMING WATER-REPELLENT FILM ON TRANSPARENT PANEL

BACKGROUND OF THE INVENTION

1. Field of the Invention

The present invention relates to a method of forming a water-resistant film on a transparent panel such as a glass panel.

2. Description of the Prior Art

Known processes of forming a water-repellent film on the surface of a glass panel such as an automobile window glass panel or mirror glass panel are disclosed in Japanese laid-open patent publications Nos. 4-338137, 4-359086, 5-24885, and 5-24886, for example.

Specifically, Japanese laid-open patent publication No. 4-338137 shows use of a solution including substituted silicon alkoxide in which part of nonmetal molecules of ceramics composed primarily of $SiO_2$ is replaced with a fluoroalkyl group, for coating the surface of a glass panel to produce a water-repellent film thereon.

Japanese laid-open patent publication No. 4-359086 shows a coating solution prepared by blending a vehicle containing a metal alkoxide with a certain amount of fluoroalkoxysilane or alkoxysilane.

According to Japanese laid-open patent publication No. 5-24885, a transparent metal film is interposed between the surface of a glass panel and a water-repellent film.

According to Japanese laid-open patent publication No. 5-24886, a film of $SiO_2$ is formed on the surface of a glass panel, which is then etched to produce surface irregularities, and a water-repellent film is formed on the surface of the glass panel.

Various processes are available for coating the surface of a glass panel with a solution to produce a water-repellent film thereon. They include a dipping process for immersing a glass panel in a coating solution, a spraying process for spraying a coating solution from a spray gun onto a glass panel, a spin-coating process for dropping a coating solution onto a glass panel while the glass panel is being rotated at high speed, thereby to spread the applied coating solution uniformly over the glass panel under centrifugal forces, and a flow process for flowing a coating solution from a nozzle onto an upper edge of a glass panel.

Moldings are bonded to the peripheral edges of automobile window glass panels or the like with an adhesive such as a urethane sealant. A water-repellent film has a poor affinity for such an adhesive. For applying an adhesive to an automobile window glass panel coated with a water-repellent film, it has been customary to apply a masking tape to a peripheral edge of the glass panel, apply a coating solution to the glass panel, thereafter remove the masking tape, and then apply the adhesive to the unmasked edge region.

FIG. 4 of the accompanying drawings is illustrative of such a conventional process of forming a water-repellent film on a glass panel. Specifically, FIG. 4 shows, in fragmentary cross section, a glass panel 100 having a coated region 101 to which a solution is applied to form a water-repellent film 103 and an uncoated edge region 102 from which a masking tape has been peeled off. The water-repellent film 103 has a raised portion 103a which is produced at its edge along the uncoated edge region 102 due to the surface tension of the applied coating solution. FIG. 5 of the accompanying drawings shows the thickness of the water-repellent film 103 as it varies with the distance of the edge of the glass panel 100. The raised portion 103a tends to produce optical interference, making the film edge too conspicuous.

SUMMARY OF THE INVENTION

It is therefore an object of the present invention to provide a method of forming a water-resistant film on a transparent panel, the water-resistant film having less conspicuous edges due to optical interference.

According to the present invention, there is provided a method of forming a water-resistant film on a transparent panel, comprising the steps of applying a coating solution to a surface of a region of the transparent panel to be coated, applying a solvent to a surface of a region of the transparent panel not to be coated in partly overlapping relation to the coating solution applied to the coated region, drying the applied coating solution and solvent, and thereafter baking the coating solution into a water-resistant film.

The coating solution may be applied by a flow process. The coating solution and said solvent may be applied in partly overlapping relation to each other in a region which has a width of at least 3 mm.

The method may further comprise the step of preparing said coating solution by mixing tetraethoxysilane, fluoroalkylsilane, ethanol, water, and aqueous solution of 0.1N hydrochloric acid, and diluting the mixture into a 20% solution.

The applied coating solution and solvent may be dried in a drying chamber at a temperature of 21° C. and a humidity of 18% with an air speed ranging from 0.3 m/min. to 0.5 m/min. The coating solution may be baked in the atmosphere at 120° C. for 20 minutes and then at 250° C. for 1 hour.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A method of forming a water-resistant film on a transparent panel according to the present invention is carried out by preparing a coating solution, applying the coating solution to the transparent panel, and baking the applied coating solution. These steps will be described below.

[Preparation of a coating solution]

In a coating solution used in the method according to the present invention, part of nonmetal molecules of ceramics containing 50% or more of $SiO_2$ is replaced with a fluoroalkyl group.

The following ingredients (a)~(c) are mixed and stirred for 20 minutes:

| (a) Tetraethoxysilane ($Si(OC_2H_5)_4$) | 200.00 g |
| (b) Fluoroalkylsilane ($CF_3(CF_2)7CH_2CH_2Si(OCH_3)_3$) | 5.46 g |
| (c) Ethanol | 1706.40 g |

To the above materials, there are added the following ingredients (d) and (e), and the mixture is stirred for 2 hours:

| (d) Water | 85.00 g |
| (e) Aqueous solution of 0.1N hydrochloric acid | 105.40 g |

The mixed solution is put in a sealed container, and left at 20° C. for 10 days. Then, the solution is diluted 5 times, i.e., diluted into a 20% solution, with ethanol for use as a coating solution.

[Application of the coating solution]

Figure 1:
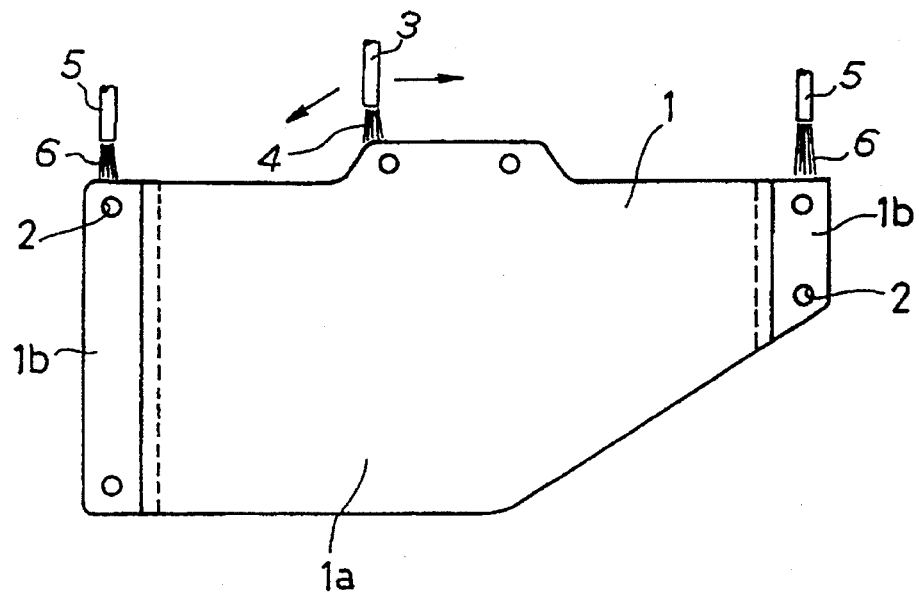
FIG. 1 is a plan view of an automobile side window glass panel on which a water-resistant film is formed by a method according to the present invention.

The coating solution is applied to a transparent panel such as a glass panel, typically, an automobile side window glass panel, by a flow process. More specifically, as shown in FIG. 1, an automobile side window glass panel 1 has a surface including a central region as a region 1a to be coated and a pair of opposite side regions as regions 1b not to be coated which have holes 2 for attachment of moldings or the like.

While the automobile side window glass panel 1 is being held in a vertical plane, the coating solution, indicated at 4, is flowed from a nozzle 3 onto the upper edge of the region 1a to be coated at a rate of 200 cc/min., and a solvent 6 is flowed from nozzles 5 onto the upper edges of the regions 1b not be coated in partly overlapping relation to the coating solution 4. The nozzles 3, 5 are spaced 5 mm from the upper edges of the regions 1a, 1b to be coated and not coated.

The solvent may be made of ethanol or the like. The coating solution and the solvent may be applied one after another or at the same time.

The coating solution may be applied to the glass panel by a spraying process.

Figure 2:
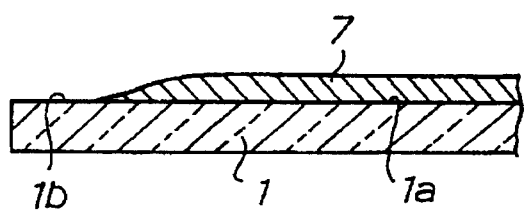
FIG. 2 is an enlarged fragmentary cross-sectional view of the automobile side window glass panel shown in FIG. 1, showing a boundary region between coated and uncoated regions thereof.
Figure 3:
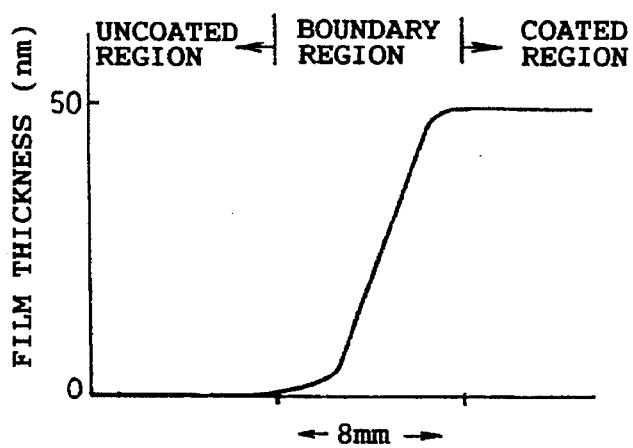
FIG. 3 is a graph showing the relationship between the film thickness and the distance from an edge of the automobile side window glass panel shown in FIG. 1.
Figure 4:
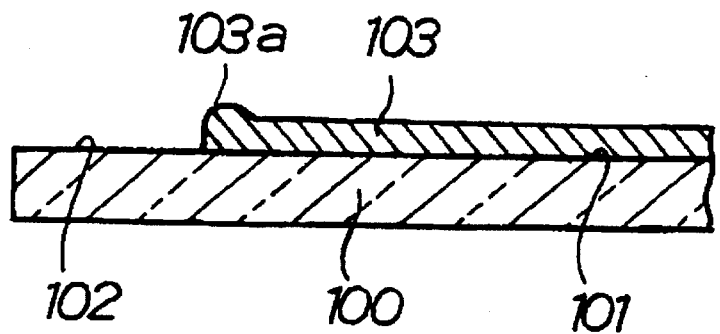
FIG. 4 is an enlarged fragmentary cross-sectional view of a glass panel, showing a boundary region between coated and uncoated regions thereof when a water-resistant film is formed by a conventional process.
Figure 5:
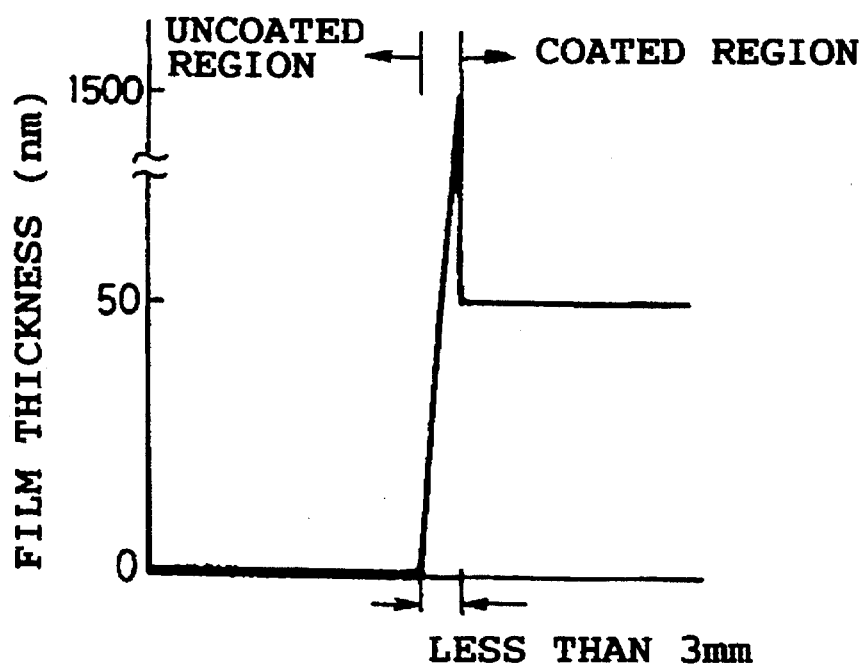
FIG. 5 is a graph showing the relationship between the film thickness and the distance from an edge of the glass panel shown in FIG. 4.

Thereafter, the applied coating solution 4 and solvent 6 are dried in a drying chamber at a temperature of 21° C. and a humidity of 18% with an air speed ranging from 0.3 m/min. to 0.5 m/min. As a result, a wet film 7 is formed on the surface of the automobile side window glass panel 1, as shown in FIG. 2.

In a boundary region between the 1a, 1b to be coated and not uncoated, the coating solution 4 is diluted by the solvent 6, and dried into the wet film 7. The wet film 7 has its thickness progressively reduced, rather than increasing, in the boundary region toward the region 1b not to be coated. Specifically, since the coating solution 4 and the solvent 6 are mixed with each other in the boundary region, the concentration of the coating solution 4 in the boundary region is lowered, and hence the film thickness in the boundary region is also lowered.

The glass panel may be made of silicate glass, silicate alkali glass, lead alkali glass, soda-lime glass, potash-lime glass, barium glass, borate glass containing $B_2O_3$ and $SiO_2$, or phosphate glass containing $P_2O_5$. Alternatively, the transparent panel may be a transparent panel of synthetic resin.

[Baking of the applied coating solution]

The automobile side window glass panel 1 coated with the wet film 7 is maintained in the atmosphere at 120° C. for 20 minutes for thereby evaporating water and ethanol. Then, the automobile side window glass panel 1 is maintained in the atmosphere at 250° C. for 1 hour. As a result, a water-repellent film is formed on the surface of the automobile side window glass panel 1 except for the regions 1b not to be coated.

In the boundary regions on the opposite sides of the water-repellent film, the coating solution 4 and the solvent 6 serve as blurred regions where the water-repellent film is progressively thinner toward the uncoated regions. Therefore, the boundary regions are not made too conspicuous due to optical interference.

Table, given below, shows Inventive Examples 1 through 4 with different nozzle-to-glass distances and different blurred region (boundary region) widths, and Comparative Example 1 using a masking tape.

TABLE

| | Coating conditions | | Blurred (Boundary) regions | | |
| | Flow rate (cc/min.) | Nozzle-glass distance (mm) | Width (mm) | Max. film thickness (nm) | Optical irregularities |
| --- | --- | --- | --- | --- | --- |
| In. Ex. 1 | 200 | 5 | 8 | 50 | None |
| In. Ex. 2 | 200 | 20 | 5 | 50 | None |
| In. Ex. 3 | 300 | 5 | 6 | 50 | None |
| In. Ex. 4 | 300 | 20 | 5 | 50 | None |
| Co. Ex. 1 | Tape applied | | <3 | 1500 | Found |

It can be seen from Table above that the water-repellent films formed by the method according to the present invention have boundary regions which are not too conspicuous and have no optical irregularities.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A method for forming a water-resistant film on a transparent panel, comprising:

applying a coating solution comprising a coating agent to a surface of the transparent panel in a region to be coated;

applying a solvent for the coating agent to a surface of the transparent panel in a region not to be coated and in partly overlapping relation with the coating solution applied to the region to be coated, the coating solution being diluted in a boundary region between the region to be coated and the region not to be coated;

drying the coating solution and solvent applied to the transparent panel into a wet film, the thickness of the wet film being progressively reduced in the boundary region in the direction of the region not to be coated; and baking the wet film to form a water-resistant film on the transparent panel.

2. A method according to claim 1, wherein said coating solution is applied by a flow process.

3. A method according to claim 1, wherein said coating solution and said solvent are applied in partly over-lapping relation to each other in a region which has a width of at least 3 mm.

4. A method according to claim 1, further comprising the step of preparing said coating solution by mixing tetraethoxysilane, fluoroalkylsilane, ethanol, water, and aqueous solution of 0.1N hydrochloric acid, and diluting the mixture into a 20% by volume solution.

5. A method according to claim 1, wherein the applied coating solution and solvent are dried in a drying chamber at a temperature of 21° C. and a humidity of 18% with an air speed ranging from 0.3 m/min. to 0.5 m/min. to form the wet film.

6. A method according to claim 1, wherein the coating solution is baked in air at 120° C. for 20 minutes and then at 250° C. for 1 hour.

7. The method of claim 1, wherein the coating solution and the solvent are applied to the transparent panel simultaneously.

8. The method of claim 1, wherein the transparent panel is glass.

9. The method of claim 8, wherein the transparent panel is an automobile side window glass panel.

10. The method of claim 1, wherein the coating solution is applied from at least one first nozzle and the solvent is applied from at least one second nozzle.

\* \* \* \* \*